US012325010B2

(12) United States Patent
Enomura

(10) Patent No.: US 12,325,010 B2
(45) Date of Patent: Jun. 10, 2025

(54) STIRRER

(71) Applicant: M. Technique Co., Ltd., Izumi (JP)

(72) Inventor: Masakazu Enomura, Izumi (JP)

(73) Assignee: M. TECHNIQUE CO., LTD., Osaka (JP)

( * ) Notice: Subject to any disclaimer, the term of this patent is extended or adjusted under 35 U.S.C. 154(b) by 848 days.

(21) Appl. No.: 17/603,878

(22) PCT Filed: Sep. 26, 2019

(86) PCT No.: PCT/JP2019/037989
§ 371 (c)(1),
(2) Date: Oct. 14, 2021

(87) PCT Pub. No.: WO2020/213192
PCT Pub. Date: Oct. 22, 2020

(65) Prior Publication Data
US 2022/0234015 A1    Jul. 28, 2022

(30) Foreign Application Priority Data

Apr. 15, 2019 (WO) .................. PCT/JP2019/016233
May 27, 2019 (WO) .................. PCT/JP2019/020976
Aug. 22, 2019 (WO) .................. PCT/JP2019/032869

(51) Int. Cl.
*B01F 27/00* (2022.01)
*B01F 27/271* (2022.01)

(52) U.S. Cl.
CPC ............ *B01F 27/2711* (2022.01); *B01F 2215/0431* (2013.01)

(58) Field of Classification Search
CPC .............. B01F 27/2711; B01F 2215/0431
See application file for complete search history.

(56) References Cited

U.S. PATENT DOCUMENTS

| 3,894,694 A | 7/1975 | Rothman |
| 2015/0321154 A1 | 11/2015 | Enomura |
| 2016/0271575 A1* | 9/2016 | Berger ............... B01F 27/2123 |

FOREIGN PATENT DOCUMENTS

| CN | 86 1 03733 A | 12/1996 |
| CN | 1280732 A | 7/2000 |

(Continued)

OTHER PUBLICATIONS

International Search Report for PCT/JP2019/037989 (PCT/ISA/210) mailed on Dec. 10, 2019.

(Continued)

*Primary Examiner* — Anshu Bhatia
(74) *Attorney, Agent, or Firm* — Birch, Stewart, Kolasch & Birch, LLP

(57) ABSTRACT

In an agitator in which cavitation arising during treatment of a fluid being treated is suppressed, a stator part S is provided with a plurality of penetration parts in the circumferential direction of the stator part S, and a stator main part positioned between adjacent penetration parts. When a fluid is discharged from the inside of the stator part S to the outside through the penetration part by the rotation of a rotor, in the stator part S for the agitator treating the fluid, the side facing a blade of the rotor is an inner wall surface, the side facing a blade of the rotor is an inner wall surface, the side facing the side opposite to the blade of the rotor is an outer wall surface, an opening of the plurality of penetration parts that is provided in the inner wall surface is an inflow opening, and an opening of the plurality of penetration parts that is provided in the outer wall surface is an outflow opening, the opening area of the inflow opening being larger than the opening are of the outflow opening.

13 Claims, 6 Drawing Sheets

(56) References Cited

FOREIGN PATENT DOCUMENTS

| | | |
|---|---|---|
| EP | 3 069 786 A1 | 9/2016 |
| JP | 60-31819 A | 2/1985 |
| JP | 60-71338 U | 5/1985 |
| JP | 60-91238 U | 6/1985 |
| JP | 62-174627 U | 11/1987 |
| JP | 2-4602 U | 1/1990 |
| JP | 7-8772 A | 1/1995 |
| JP | 8-141378 A | 6/1996 |
| JP | 2002-221824 A | 8/2002 |
| JP | 2005-177701 A | 7/2005 |
| JP | 2010-104903 A | 5/2010 |
| JP | 4631538 B2 | 2/2011 |
| JP | WO2014/010094 A1 | 1/2014 |
| KR | 10-2006-0122302 A | 11/2006 |
| KR | 10-2014-0073023 A | 6/2014 |
| WO | 98/46341 A1 | 10/1998 |
| WO | WO 2014/010062 A1 | 1/2014 |

OTHER PUBLICATIONS

Extended European Search Report for European Application No. 19925046.5, dated May 23, 2023.

* cited by examiner (A)

(B)

STIRRER

TECHNICAL FIELD

The present invention relates to improvement of a stirrer, especially a stirrer used for refinement, homogenization, emulsification, or dispersion of a fluid to be processed.

BACKGROUND ART

Various stirrers have been proposed as an apparatus to carry out processing of emulsification, dispersion, or mixing of a fluid, however, today, it is required that the stirrer can satisfactorily process a fluid to be processed containing a substance having a small particle diameter such as nanoparticle.

For example, a bead mill and a homogenizer are known as a kind of widely known stirrer, emulsifier, and disperser.

There is a problem in the bead mill, however, that a crystal state in surface of particle is destructed and damaged thereby decreasing in a performance thereof. In addition, there is a big problem of generation of foreign materials as well as a high-cost problem of the beads which are frequently replaced or fed.

In a high-pressure homogenizer, problems such as unstable operation of the machine as well as a large power requirement have not been solved yet.

A rotary-type homogenizer has been conventionally used as a preliminary mixer; but, in order to carry out nano-dispersion or nano-emulsification, a finishing machine is required to further finish the particles to a nanometer size. In this case, by enhancing the preliminary mixer in its performance, the load of the finishing machine performing nano-dispersion or nano-emulsification can be reduced.

PRIOR ART

Patent Documents 1 to 6 exemplify examples of conventional techniques.

Patent Document 1 describes the stirrer comprising a plurality of cutter blades, a rotating rotor, and a stator arranged around the rotor, on which they are concentrically provided, the stator includes a plurality of slits in the circumferential direction thereof and a stator main part located between the slits adjacent to each other. When a fluid to be processed is discharged from the inside to outside of the stator through the slit by rotating at least the rotor of the rotor and stator, a strong shear force is given to perform refinement, homogenization.

Patent Document 2 describes the stirrer comprising a plurality of cutter blades, a rotating rotor, and a stator arranged around the rotor, on which they are concentrically provided, the stator has a plurality of round holes or rectangular penetrating holes in a cylindrical side wall thereof. In the same way as Patent Document 1, Patent Document 2 shows that when a fluid to be processed is discharged from the inside to outside of the stator by rotating the rotor, a shear force is given to perform homogenization.

Patent Document 3 describes the method for producing the polymer toner having a further fine particle diameter and a sharp particle diameter distribution by controlling the tip speed of the stirrer and the pressure of the processing part. Patent Document 4 describes the production apparatus that can produce an aqueous dispersion solution with a low cost and safely by circulating a disperser with addition of water, a resin material, and a natural wax that form aqueous dispersion solution, and a surfactant.

However, according to Examples described in Patent Documents 3 and 4, the rotation speed of rotor is very fast, it is naturally in the rotation speed of 25 m/s or more, and the rotor is operated at the rotation speed of 35 m/s or more, so that problem of cavitation occurs.

In Patent Document 5, it is advantageous that by arranging an inducer in the stirring/dispersion part, namely in the upstream part of the rotor/stator, the mixing performance is improved so that the mixture without agglomerates can be obtained, and particularly the useful advantageous is that the effect of the cavitation can be reduced.

Cavitation is a physical phenomenon in which generation and extinction of air bubbles take place in a short time due to the pressure change or the temperature change in the flow of a fluid. The dissolved gas in a liquid is more dissolved as a pressure increases, and conversely, the dissolution degree thereof decreases as the pressure decreases. In addition, dissolution degree of the dissolved gas in a liquid is decreased as the temperature rises, and conversely, the dissolution degree thereof is increased as the temperature decreases.

The fluid to be processed is discharged by the rotor that rotates at a high speed. At this time, the pressure of the fluid to be processed in the rotational direction side of the rotor increases, while the pressure of the fluid to be processed on the back surface of the rotor decreases.

In addition, when the fluid is discharged by the rotor and passes through the opening of the stator, increase and decrease of the pressure is repeated thereby affecting the increase of the temperature in a microscopic region, thus the cavitation occurs.

The grown cavitation is sometimes called a hollowing phenomenon.

The cavitation is largely affected by a mechanical shape, an operation condition, a dissolved gas, a surface roughness, and the like.

Even if the processing such as atomization can be successfully performed by cavitation with an experimental machine, the situation often occurs that the processing using the cavitation cannot be reliably reproduced at the time of scaling up.

The cavitation involves the process of initial generation and subsequent growth of air bubbles and collapse of the air bubbles due to increase of the pressure. At the time of collapse of the air bubbles, erosion occurs with the energy of several thousand atmospheric pressure.

Nowadays, it may include the concept of evaporation, but as the real problem, the erosion due to cavitation is a serious problem. This is because when erosion occurs, not only vibration of the machine, but it also leads to damage to the machine.

It has been known that the processing ability can be increased with suppressing cavitation by changing the rotation number of the rotor (rotational circumferential speed of the front-end part of the blade). Under the condition of constant rotation number of the rotor (rotational circumferential speed of the front-end part of the blade), it is considered effective that the number of the slit is increased by narrowing the width of the slit, or the number of the rotor of the blade is increased, or both.

However, when the width of the slit is made too wide, the pressure of the fluid to be processed passing though the slit decreases which leads to slow the discharge flow speed thereof, thus the processing ability decreases. On the other hand, when the width of the slit is made narrow, the discharge speed becomes faster, however in the case that the width is made too narrow, the pressure loss increases which leads to decrease the flow amount of the fluid to be processed passing through the slit, so that the discharge flow may not be generated well, or the hollowing phenomenon may occur. As a result, there has been a limitation to increase the number of the slit by narrowing the slit width.

Regrettably, a precise analysis of cavitation is difficult with current flow analysis simulation technology.

By increasing the rotation number of the rotor, the processing ability of the stirrer may be improved. In this method, by increasing the rotation number of the rotor, the discharge amount of the fluid to be processed discharged from the inside to the outside of the stator through the slit is increased, thus the speed thereof is increased. In this case, the following points become problems. The sound speed is about 340 m/sec in air at room temperature, and about 1500 m/sec in water, but when the air bubbles are mixed due to the cavitation, the sound speed in water is dramatically decreased.

The sound speed in the water including air bubbles with the void rate of 0.2 is 30 m/sec or less, and the sound speed in the water with the void rate of 0.4 is about 20 m/sec.

In Patent Documents 4 and 5, it is considered that the speed of the intermittent jet stream passing through the stator is close to the sound speed in the water including air bubbles, and when the speed of the jet stream exceeds the sound speed, a shock wave is generated and damage to the machine occurs. Therefore, it is required to suppress generation of the air bubbles due to cavitation as much as possible and solve the problem of the shock wave.

As an illustrative example of the homogenizer, Patent Document 6 describes the homogenizer which comprises the stator having a plurality of crushing blades in the upper and lower surfaces thereof in a circular shape and two rotors having a plurality of stirring blades that engage with the crushing blades of the stator in a radial direction and the opening to take in the substance to be crushed, by the rotation of the rotors in which the rotors are fixed to the upper and lower surfaces of the stator by sandwiching the stator therebetween by the shaft, a liquid, or a liquid and a powder is stirred, and a hood is arranged in an opening part of the rotor.

However, since Patent Document 6 does not fully consider to suppression of the cavitation, the problem of cavitation cannot be eliminated due to the remarkable increase in the power and widening of the pressure distribution in the processing part.

CITATION LIST

Patent Document

Patent Document 1: Japanese Unexamined Patent Application Publication No. S60-31819
Patent Document 2: U.S. Pat. No. 3,894,694
Patent Document 3: Japanese Unexamined Patent Application Publication No. 2002-221824
Patent Document 4: Japanese Unexamined Patent Application Publication No. H07-8772
Patent Document 5: European Patent Application Publication No. 3069786 A1
Patent Document 6: Japanese Unexamined Patent Application Publication No. 2005-177701

DISCLOSURE OF INVENTION

Problem to be Solved by the Invention

In view of the circumstances described above, the present invention has an object to provide a stirring device that suppresses the generation of cavitation, so that the stirring is effectively performed to a fluid to be processed, and the processing such as refinement, homogenization, or emulsification is facilitated.

Means for Solving the Problem

The present invention was achieved by attempting to improve the stirrer from a novel viewpoint of increasing the substantial relative speed difference of the fluid to be processed between a rotor which is rotating body and a stator being fixed. Specifically, by restudying the cross-sectional shape of a penetrating part provided on the stator, the stirrer capable of increasing the relative speed difference of the fluid to be process could be provided. In addition, the inventor of the present invention restudied the cross-sectional shape of the penetrating part provided on the stator, so that the inventor found that the relative speed difference of the flow of the fluid to be processed could be increased, the pressure loss of the fluid to be processed could be reduced, and the cavitation could be suppressed, thus a shear force could be given to the fluid to be processed being discharged from the inside to the outside of the stator through the penetrating part, and then the present invention has been completed.

Therefore, the present invention provides an stirrer comprising a stator and a rotor capable of rotating to the stator, the rotor is provided with a main shaft as a center of the rotation and a plurality of blades, the stator is provided with one or a plurality of stator part, the stator part surrounds the plurality of blades with the main shaft of the rotor as the center thereof; and a rotational direction of the rotor being in a circumferential direction, the stator part comprises a plurality of penetrating parts in the circumferential direction thereof and a stator main part located at least between the penetrating parts adjacent to each other, and when discharging a fluid from inside to outside of the stator part through the penetrating part by rotating at least the rotor out of the rotor and the stator, at least any one of refinement, homogenization, emulsification, and dispersion is performed to the fluid; and the stirrer having the following composition is provided.

Namely, the stirrer is characterized in that a side of the stator part facing to the blades is served as an inner wall surface of the stator part, and a side of the stator part facing to a side opposite side to the blades is served as an outer wall surface of the stator part, and; an opening of each of a plurality of the penetrating parts provided on the inner wall surface of the stator part is served as an inflow opening, an opening of each of a plurality of the penetrating parts provided on the outer wall surface of the stator part is served as an outflow opening; and an opening area of the inflow opening is arranged so as to be larger than an opening area of the outflow opening.

Further, the present invention provides an stirrer comprising a stator and a rotor capable of rotating to the stator; the rotor is provided with a main shaft as a center of the rotation and a plurality of blades, the stator is provided with one or a plurality of stator part, the stator part surrounds the plurality of blades with the main shaft of the rotor as the center thereof; and a rotational direction of the rotor is in a circumferential direction; the stator part comprises a plurality of penetrating parts in the circumferential direction thereof and a stator main part located between the penetrating parts adjacent to each other; and a fluid is discharged from inside to outside of the stator part through the penetrating part by rotating at least the rotor out of the rotor and the stator; and the stirrer having the following composition is provided.

Namely, the stirrer is characterized in that a side of the stator part facing to the blades is served as an inner wall surface of the stator part, and a side of the stator part facing to a side opposite to the blades is served as an outer wall surface of the stator part; an opening of each of a plurality of the penetrating parts provided on the inner wall surface of the stator part is served as an inflow opening, an opening of each of a plurality of the penetrating parts provided on the outer wall surface of the stator part is served as an outflow opening, a space between the inflow opening and the outflow opening is served as an inner space of the penetrating part, and the inner space of the penetrating part includes a minimum cross-sectional part whose cross-sectional area is smaller than any other part of the inner space in the middle way from the inflow opening to the outflow opening; an opening area of the outflow opening and an opening area of the inflow opening are provided so as to be larger than the cross-sectional area of the minimum sectional-area part of the inner space of the penetrating part.

In addition, the present invention could provide the stirrer in which the penetrating part is at least any one of a slit and a penetrating hole; the extending direction of the main shaft of the rotor is as an axial direction, in the slit, a width in the axial direction of the stator part is larger than a width of the slit in the circumferential direction of the stator part, the slit is at least any one of a long hole having both ends in the axial direction of the stator part and a cut-out part having one end thereof opened in the axial direction of the stator part; in the slit, a width (Si) of the inflow opening is provided so as to be larger than a width (So) of the circumferential direction of the outflow opening in the circumferential direction of the stator part; and in the penetrating hole, an area of the hole of the inflow opening is provided so as to be larger than an area of the hole of the outflow opening.

Further in addition, the present invention could provide the stirrer in which the penetrating part is at least any one of a slit and a penetrating hole, and the extending direction of the main shaft of the rotor is as an axial direction; in the slit, a width in the axial direction of the stator part is larger than a width of the slit in the circumferential direction of the stator part, the slit is at least any one of a long hole having both ends in the axial direction of the stator part and a cut-out part having one end thereof opened in the axial direction of the stator part; in the slit, a width (So) of the outflow opening and a width (Si) of the inflow opening are provided so as to be larger than a width (Sm) of the minimum cross-sectional part in the inner space in the circumferential direction of the stator part; and in the penetrating hole, an area of the hole of the outflow opening and an area of the hole of the inflow opening are provided so as to be larger than an area of the hole of the minimum cross-sectional part in the inner space.

Further in addition, the present invention could provide the stirrer in which a maximum length of an arc of the outflow opening that forms the arc along the circumferential direction of the stator part is 0.2 mm or more, and a maximum length of an imagination string 14 connecting both ends 14a, 14b of the arc as shown in FIG. 6 is 4.0 mm or less.

Still further in addition, the present invention could provide the stirrer in which the stator is provided with a plurality of the stator parts in a radial direction of the stator concentrically with the main shaft of the rotor.

Advantageous Effect of the Invention

The present invention could provide a stirring device that suppresses the generation of cavitation, so that the stirring is effectively performed to a fluid to be processed, and the processing such as refinement, homogenization, or emulsification is facilitated.

That is, with respect to the fluid that is stirred by the rotor and is discharged from the inside to the outside of the stator thorough the penetrating part of the stator, the object is solved by increasing the moving speed of the fluid in the side of the outflow opening of the penetrating part rather than the side of the inflow opening thereof.

In the embodiment level of the present invention, the distance between the stator and the rotor is set to minute distance, and the penetrating part is substantially made open and close by a relative rotation of the rotor to the stator thereby intermittently discharging the fluid from the inflow opening to the outflow opening of the stator through the penetrating part. By so doing, upon conducting refinement or homogenization by applying a strong shear force to the fluid, generation of the cavitation could be suppressed.

In particular, the present invention could provide the stirrer capable of shearing more efficiently.

In addition, in the present invention, as a result of the efficient shearing, extremely fine dispersion or emulsification such as nano-dispersion or nano-emulsification could be realized.

Further in addition, the present invention could provide the stirrer capable of obtaining the particles having a narrow particle diameter distribution with a uniform particle diameter.

The present invention is not restricted to the embodiment in which the distance between the stator and the rotor is set to minute distance, and the penetrating part is substantially made open and close by a relative rotation of the rotor to the stator thereby intermittently discharging the fluid from the inflow opening to the outflow opening of the stator through the penetrating part, and by so doing, refinement or homogenization is conducted by applying a strong shear force to the fluid.

That is, the present invention can conduct the above-mentioned processing with suppressing the cavitation not only by the embodiment in which the penetrating part is made open and close substantially by a relative rotation of the rotor to the stator, but also by the embodiment in which by configuring the shape of the penetrating part so as to be the one as described before, there is a sufficient distance made between the stator and the rotor so as to continuously discharge the fluid from the inflow opening of the stator to the outflow opening thereof.

Specifically, not only in the case of the minute distance between the stator and the rotor in the range of 0.2 or more to 2 mm or less, but also in the case of the non-minute distance in which the distance between the stator and the rotor is more than 2 mm, the present invention enables the stirring processing that is less affected by cavitation in refinement, homogenization, or emulsification.

BEST MODE FOR CARRYING OUT THE INVENTION

Figure 1:
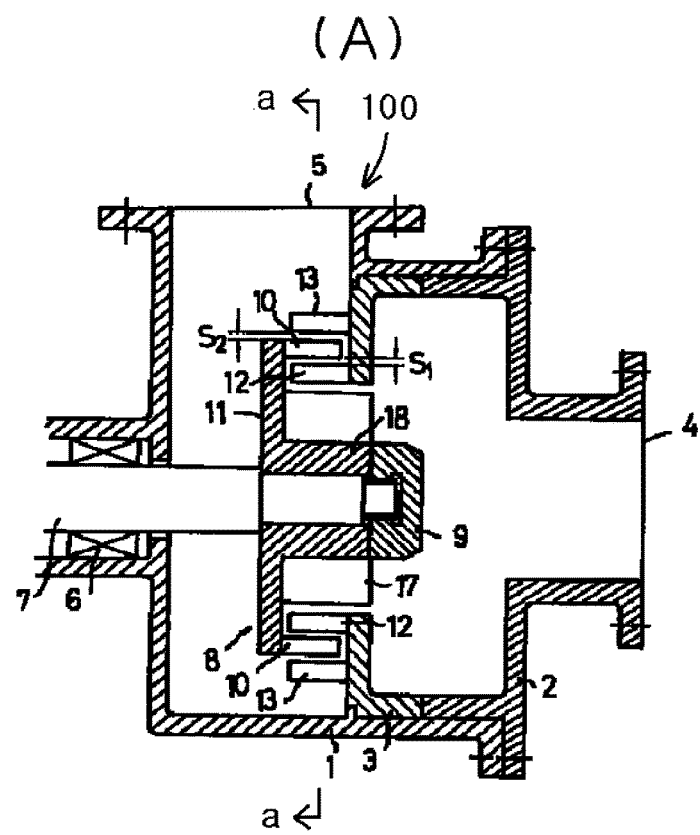
In FIG. 1, (A) is an enlarged cross-sectional view of the essential part of the stirrer 1 that is suitable to carry out the present invention, and (B) is the a-a cross-sectional view of the essential part of (A).
Figure 1:
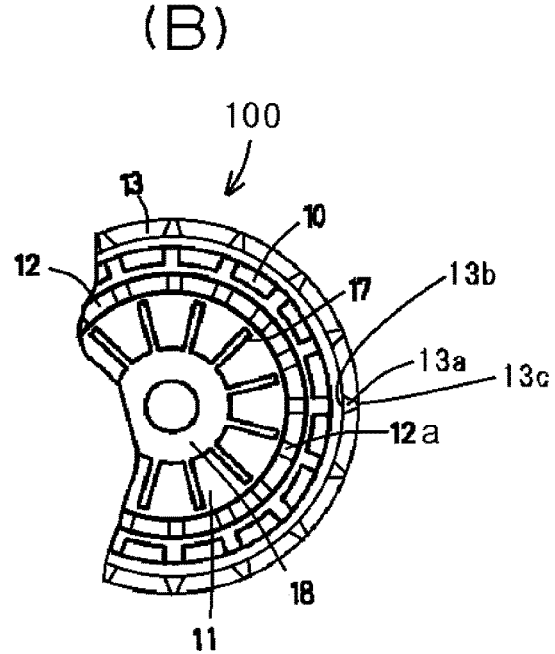

Hereinafter, with referring to the drawings, embodiments of the present invention will be explained.

Figure 2:
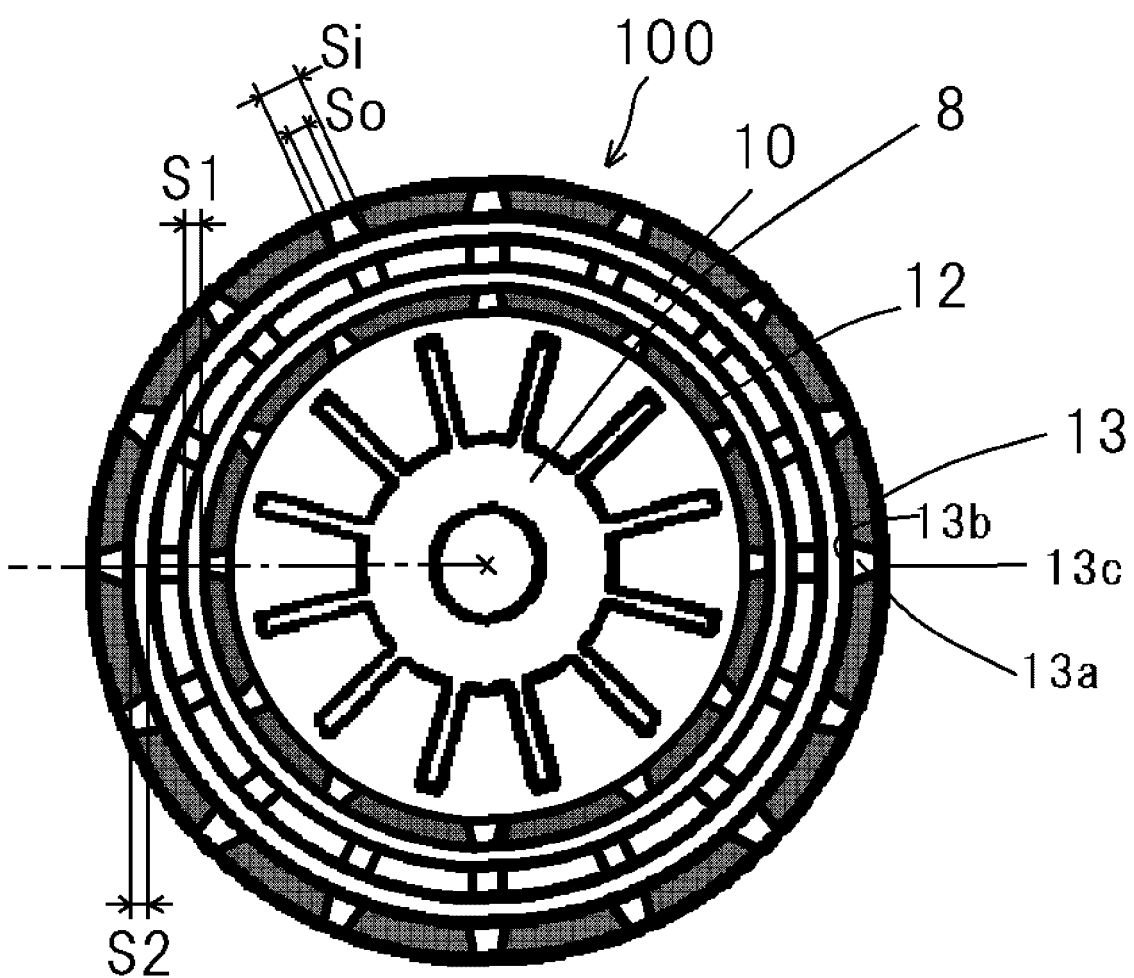
FIG. 2 is an enlarged longitudinal cross-sectional view of the embodiment of the stator in the stirrer 1 according to the present invention.

An example of a stirrer 100 suitable for carrying out the present invention is shown in FIG. 1(A), and an example of applying the present invention to the stirrer 100 of FIG. 1(A) is shown in FIG. 1(B) and FIG. 2.

In FIG. 1, reference number 1 denotes a casing, and a stator 3 is fixed by a suction cover 2. A suction port 4 is provided on the suction cover 2, and a discharge port 5 is provided on the casing 1. A main shaft 7 is rotatably provided so as to penetrate a shaft seal device 6 provided in the casing 1. A rotor 8 is fixed to the front end of the main shaft 7 by means of a nut 9.

A plurality of rotor cutters 10 intermittently provided on the rotor 8 along a circumferential direction are provided while being supported by a shroud 11. In the stator 3, stator cutters 12 and 13 are intermittently arranged along a circumferential direction in such a way as to concentrically sandwich the rotor cutter 10 from both sides thereof with a distance S1 and a distance S2 in a radial direction.

The circumferential direction coincides with the rotational direction of the rotor 8 (of the main shaft 7).

Hereinafter, a plurality of the stator cutters 13 arranged outside of the circle formed by a plurality of the rotor cutters 10 is referred to as an outer stator cutter 13, if necessary. Also, a plurality of the stator cutters 12 arranged inside of the circle formed by a plurality of the rotor cutters 10 is referred to as an inner stator cutter 12, if necessary.

In the examples shown in FIG. 1 and FIG. 2, each of the outer stator cutters 13 corresponds to "stator main part" in the claims, and the space between the adjacent outer stator cutters 13 constitutes a penetrating part 13a.

In the stator 3, the opening facing to the center of the rotor 8 (main shaft 7) in the penetrating part 13a is made to an inflow opening 13b of a fluid (fluid to be processed), and the opening facing to the opposite side, namely outside, of the center of the rotor 8 is made to an outflow opening 13c of the fluid.

An opening area of the inflow opening 13b is provided so as to be larger than an opening area of the outflow opening 13c (FIG. 1(B)). That is, the penetrating part 13a is a tapered space that gradually decrease the cross-section of the penetrating part (the cross-section of the surface perpendicular to the moving direction of the fluid) from the side of the inflow opening 13b toward the side of the outflow opening 13c.

In this example, each of the inner stator cutters 13 constitutes the inner stator main part, and the space between the adjacent inner stator cutters 12 constitutes an inner penetrating part 12a.

Next, the entire action of the stirrer 100 shown in FIG. 1(A) will be described.

When the rotor 8 rotates by driving of the main shaft 7, a fluid to be processed is sucked from the suction port 4 due to the pumping action of the rotor cutter 10 and is flew out through the stator cutter 12, the rotor cutter 10, and the stator cutter 13 to outside thereof, and then the fluid is discharged from the discharge port 5. During this process, the fluid to be processed is refined, homogenized, emulsified, or dispersed by the high-speed shearing action among the stator cutters 12 and 13, and the rotor cutter 10.

However, in the conventional type of the stirrer shown in FIG. 1(A), when the pressure in the suction side is high, stable operation is possible, but when the pressure in the suction side is decreased, cavitation occurs, further when the condition is deteriorated, a noise and a vibration are generated thereby causing a significant deterioration of the performance. For this reason, a blade 17 is provided on the center side (side of a hub 18), so that a dispersion device not causing the trouble even when the pressure in the suction side is decreased is provided.

In the example shown in FIG. 1(B), in the inner penetrating part 12a, an inside inflow opening 12b facing the center side of the rotor 8 and an inside outflow opening 12c facing the opposite side to the center of the rotor 8 have substantially the same opening area, however, especially in the inner penetrating part 12a, by making the opening area of the inside inflow opening 12b larger than the opening area of the inside outflow opening 12c, the fluid can be more effectively processed (FIG. 2).

The space between the adjacent rotor cutters 10 may also have the same composition as those of the penetrating part 12a and the inner penetrating part 13a (FIG. 2).

Although not shown, the stator 3 may further arrange a group of third stator cutters inside of the circle formed by the group of the inner stator cutters 12. Further, the stator 3 may have circles of the stator cutters arranged in multiple (multi-stages) of four or more groups. Further, in line with multiplication of the stator cutter group, the rotor cutter group may also be multiplied.

In the example shown in FIG. 1 and FIG. 2, the group of the outer stator cutters 13 constitutes one stator part S (outer stator part S), and the group of the inner stator cutters 12 constitutes another stator part S (inner stator part S).

In addition, one stator part S may be formed as one cylindrical body rather than being composed of the group of the outer stator cutters 12 or by the group of the inner stator cutters 12.

Specifically, in the stator 3, the stator cutters 12 and 13 shown in FIG. 1 and FIG. 2 are not arranged along the circumferential direction (radial direction) of the stator 3, but the stator 3 is provided with two or more cylindrical bodies arranged concentrically with respect to the main shaft 7 of the rotor 8.

Then, the cylindrical body of the stator 3 may be formed as the stator part S (the outer stator part S corresponding to the group of the outer stator cutters 13 and the inner stator part S corresponding to the inner stator cutters 12), and the penetrating part 13a and the inner penetrating part 12a may be formed as the hole penetrating through the side part of the stator part S (penetrating hole).

Figure 5:
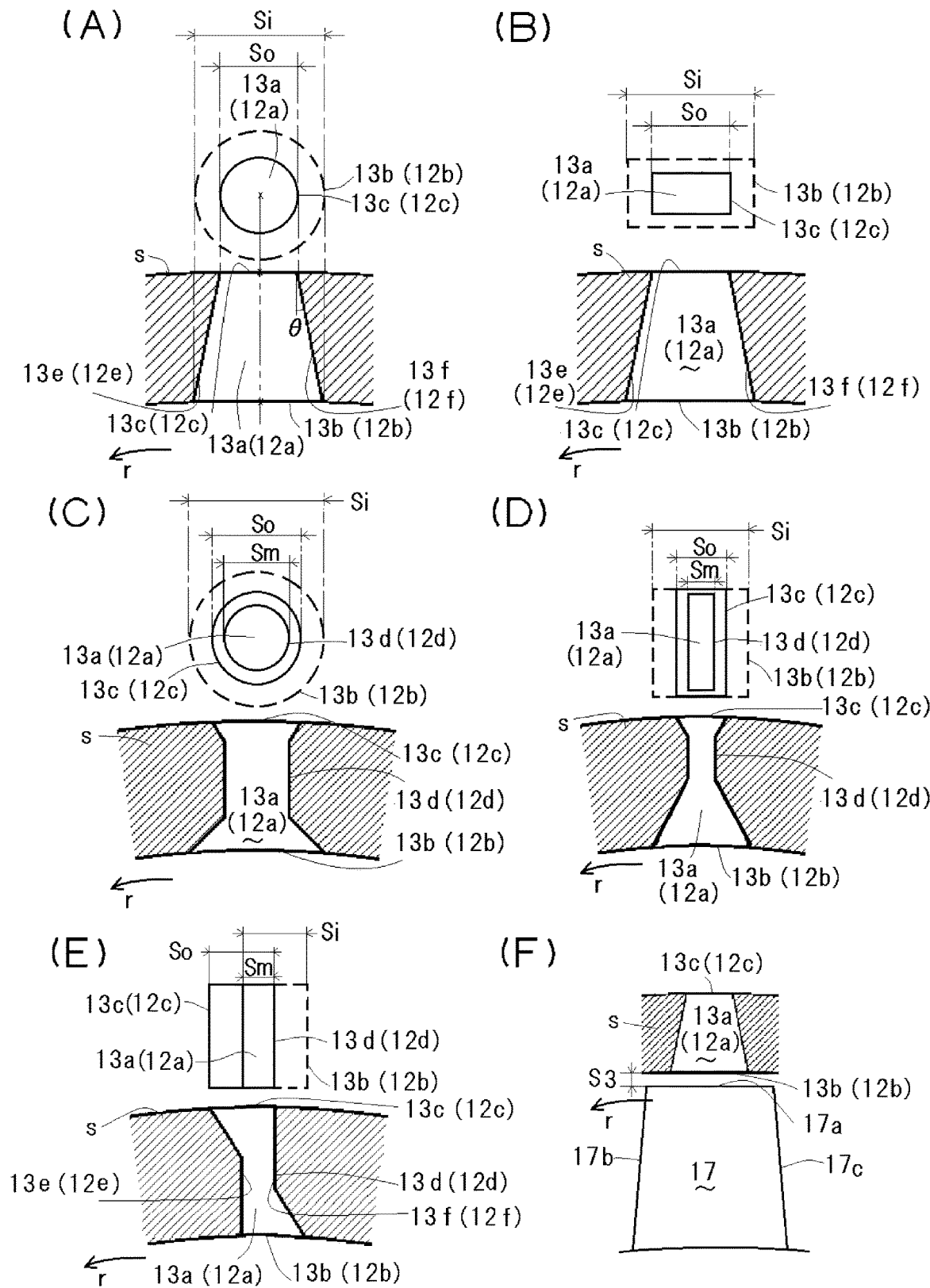
In FIGS. 5, (A), (B), (C), and (D) show the embodiment of the stator in the stirrer according to the present invention. All of these are the vertical sectional views (cut along the circumferential direction of the stator) of the essential parts together with the explanatory views showing the front views (planes in drawings of FIG. 5) of the penetrating part viewed upward in the enlarged cross-section of the essential part. (F) shows the positional relationship of the blade with the stator illustrated in (A), (B), (C), and (D).
Figure 6:
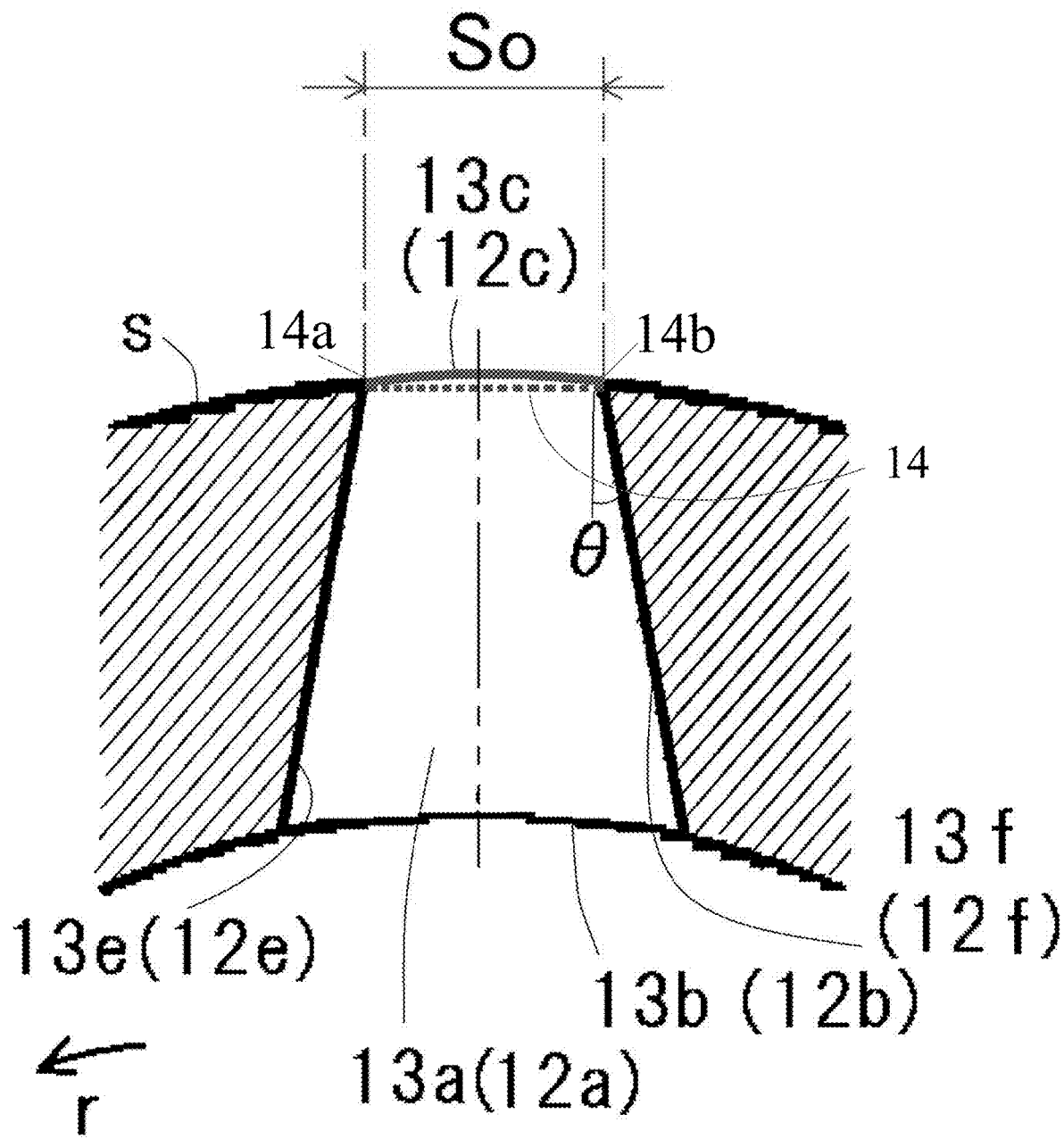
FIG. 6 is an enlarged view of the stator in the stirrer according to one embodiment of the present invention.

The stator 3 may be provided with only the group of the outer cutters 13 and not with the group of the inner stator cutters 12, namely, may be provided with only one stator part S (FIG. 5).

When the penetrating part 13a or the inner penetrating part 12a is used as a hole, the outline of the hole (opening) may be a true circle or may be an elongated circle. Further, the penetrating parts may be not limited to a circle but may be a polygon such as a rectangle having a triangle or more, a circle, or a contour formed by a curved line or a combination of a curved line and a straight line.

In the case where the stator part S is used as the cylindrical body, and the penetrating part 13a and the inner penetrating part 12a are used as the hole, the area (region) located between the adjacent holes in the stator part S corresponds to "stator main part" in the claims.

In addition, since the width in the axial direction (thrust direction) of the stator 3 is relatively large with respect to the width in the circumferential direction of the stator 3, the one, which is more suitable to be called a slit than a hole, can be used as the penetrating part. In this case, the slit may be provided with both ends, or may be a cut-out part having one end thereof opened in the axial direction of the stator 3.

In addition, the slit may extend linearly along the axial direction of the stator 3 or may extend spirally to the axial direction.

Figure 3:
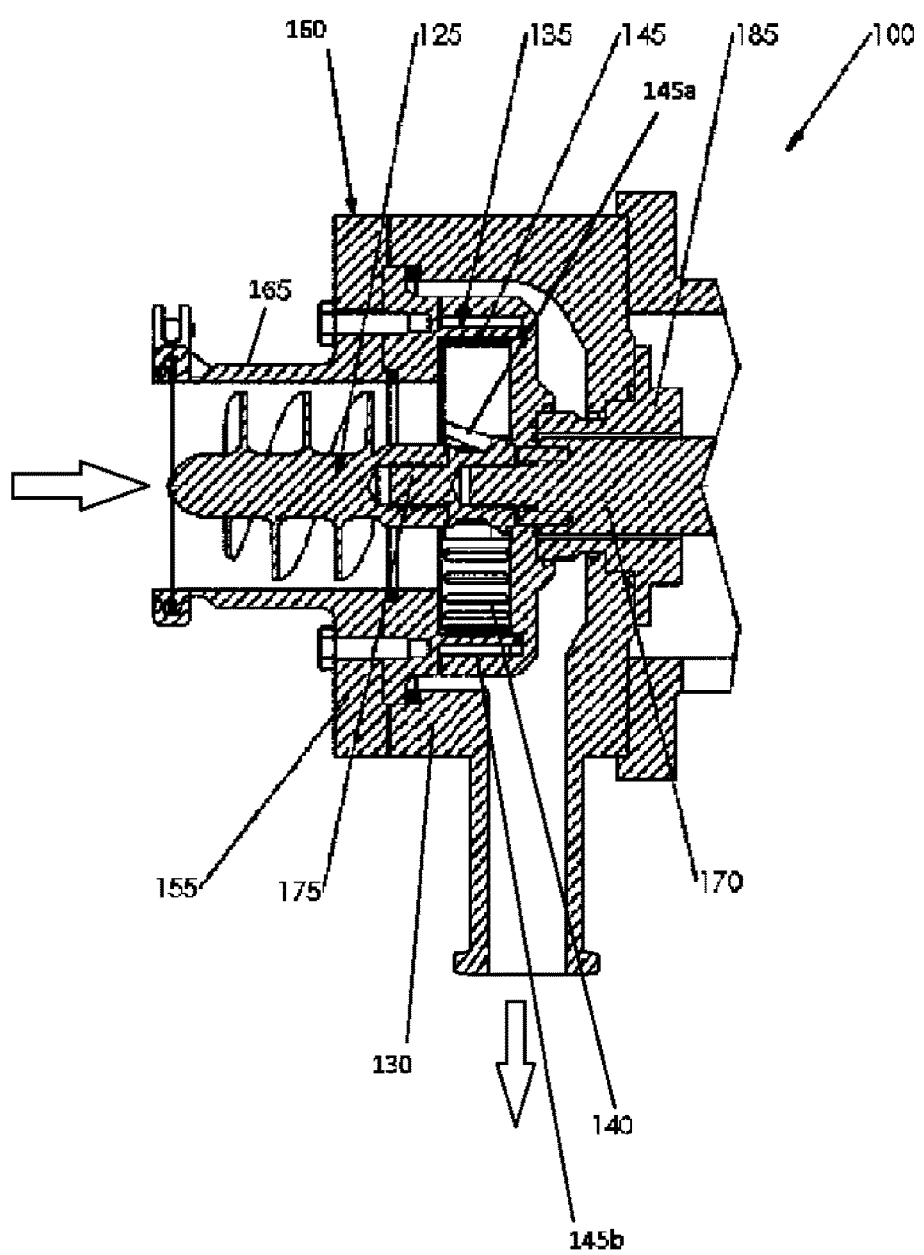
FIG. 3(A) is an enlarged view of the essential part of the stirrer 100 that is suitable to carry out the present invention.

An example of the stirrer 100 suitable for carrying out the present invention using the penetrating part as the slit is shown in FIG. 3.

In FIG. 3, the fluid to be processed is introduced into the stirrer 100 and discharged after being processed, as shown by open arrows.

A stator 140 is fixed to an entrance 155 of a housing 160, and a rotor 145 is attached to a rotatable shaft 170 driven by a motor (not shown). In this embodiment, the rotor is a multistage rotor having a blade 145a arranged so as to be rotate inside of the stator 140 and a blade 145b for rotating outside of the stator 140. The shaft 170 penetrates through a shaft seal device 185.

Figure 4:
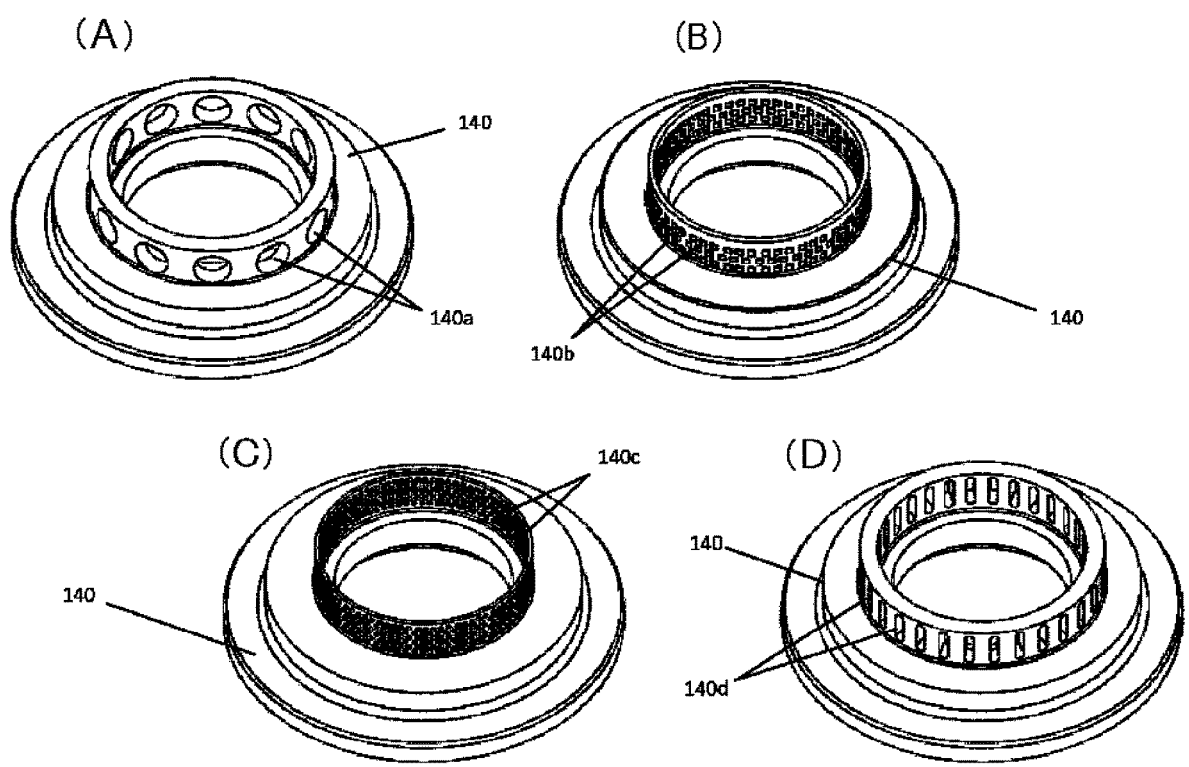
FIGS. 4(A) to (D) are the perspective views of the examples of the stator in the stirrer 100 that is suitable to carry out the present invention.

FIG. 4 shows the perspective views of the stator 140. There are various shapes such as the penetrating hole of a true circle, the penetrating hole of a rectangle (140a, 140b, and 140c of FIGS. 4(A) to (C)), and the penetrating hole of a slit (140d of FIG. 4(D)).

In addition to a stirrer main part 135, an inducer 125 that supplies the fluid to be processed while substantially pressurizing is arranged at a port 165 that is in the upstream of the stirrer main part 135. The inducer 125 is arranged so as to be concentrical with the rotor 145 and rotate simultaneously with the rotor 145.

When the inducer 125 rotates, a pressure difference is generated to suck the fluid to be processed toward inside of the housing 160. Therefore, the inducer 125 can function as a small booster pump to reduce the positive suction head (NPSH) required for the stirrer main part 135, so that the cavitation can be further reduced.

In FIGS. 5(A) to (E), specific examples of the penetrating part arranged in the stator of the stirrer is shown in FIG. 1(B) and FIG. 2 to FIG. 4. In FIGS. 5(A) to (E), the blade 17 of the rotor 8 is omitted; in FIG. 5(F), the front-end part of the blade 17 that rotates to the stator 3 (stator part S) is shown. In FIGS. 5(A) to (F), "r" indicates the rotational direction of the blade 17.

In the examples shown in FIGS. 5(A) to (F), the stator 3 includes only one stator part S (outer stator part S); the rotor 8 does not include the rotor cutter 10 described above (FIG. 1 and FIG. 2). However, as described above, the stator 3 may be provided with the multistage of the stators S or may be provided with the rotor cutter 10. The inner stator part S may constitute the parts of the inner penetrating part 12a and the inner penetrating part 12a in the same manner as in FIGS. 5(A) to (F). In this case, the numerical symbols in the figures shall be read as described in the brackets.

In each example of FIG. 5, a distance S3 (FIG. 5(F)) between the stator part S and the blade 17 of the rotor 8 is preferably a minute distance of 0.2 or more to 2 mm or less, but this may also be a non-minute distance of 2 mm or more. Further, in the example shown in FIG. 1(B) and FIG. 2, the distance between the group of the inner stator and the blade 17 may be the minute distance or the non-minute distance as described above.

Further, in the example shown in FIG. 1(B) and FIG. 2, the distance S1 between the rotor cutter 10 and the outer stator part S and the distance S2 between the rotor cutter 10 and the inner stator part S may be set to the minute distance or the non-minute distance.

The blade 17 shown in FIG. 5(F) is an illustrative example, and unlike FIG. 5(F), a scooping surface 17b and a surface 17c on the opposite side of the scooping face may be parallel to each other, or the inclination angles of the scooping surface 17b and of the opposite surface 17c may not be symmetrical (right and left in FIG. 5(F)), or a front-end surface 17a may be inclined to the rotation direction of the blade 17, that is, at the angle formed by the front-end surface 17a with the scooping surface 17b and the angle formed by the front-end surface 17a with the opposite surface 17c, the rotation tracks od both angles may not coincide (not shown).

In the examples shown in FIGS. 5(A) and 5(B), the width So of the inflow opening 13b in the circumferential direction of the stator 3 is narrower than the width Si of the outflow opening 13c.

In particular, the maximum length of the arc of the outflow opening 13c having an arc along the circumferential direction of the stator part S (circumferential direction of the stator 3) is preferably 0.2 mm or more, and the maximum length of a string connecting both ends of the arc is preferably 4.0 mm or less.

The width between the side facing the scooping surface 17b of the rotating blade 17 (back-side end 13e) and the opposite side thereof (front-side end 13f) is gradually narrowed from the inflow opening 13b toward the outflow opening 13c. Specifically, in both back-side end 13e and the front-side end 13f of the penetrating part 13a, which is the truncated conical shape, the center line of the penetrating part 13a (the two-dot chain line in FIG. 5(A)), namely, the narrow angle θ (inclination angle) against the straight line passing through the center of the inflow opening 13b and the center of the outflow opening 13c is preferably in the range of 1 to 45 degrees.

In the example shown in FIG. 5(A), the penetrating part 13a is a mortar-shaped (truncated conical) space that gradually tapers from the inflow opening 13b toward the outflow opening 13c. Therefore, it is suitable that the generating line of the penetrating part 13a, which is the truncated cone, has the narrow angle θ (inclination angle) against the center line.

The penetrating part 13a may be a truncated pyramid instead of the truncated cone. FIG. 5(B) shows the example in which the penetrating part 13a is the truncated square pyramid shape. In the penetrating part 13a shown in FIG. 5(B), a pair of the front and rear slant surfaces in the rotation direction are the back-side end 13e and the front-side end 13f, respectively, and the narrow angle against the center line is the same as the generating line of FIG. 5(A).

Further, the penetrating part 13a (12a) ma be provided with a minimum cross-sectional part 13d having cross-sectional area smaller than that of the inflow opening 13b and the outflow opening 13c in the middle of the section from the inflow opening 13b to the outflow opening 13c (FIG. 5(C) to FIG. 5(E)). Specifically, in the penetrating part 13a, the cross-sectional area thereof is gradually decreased from the inflow opening 13b toward the minimum cross-sectional part 13d. Further, in the penetrating part 13a, the cross-sectional area thereof is gradually increased from the minimum cross-sectional part 13d toward the outflow opening 13c. The minimum cross-sectional part 13d is the narrow part arranged in the penetrating part 13a.

The minimum cross-sectional part 13d may be a ring-like ridge not having the width formed between the inflow opening 13b and the outflow opening 13c (not shown). Also, the minimum cross-sectional part 13d may be a minimum diameter section having a certain width between the inflow opening 13b and the outflow opening 13c (FIG. 5C to FIG. 5E).

When the minimum cross-sectional part 13d is provided, the cross-sectional area of the outflow opening 13c may be smaller than that of the inflow opening 13b, or as far as the effect of the present invention can be obtained, the cross-sectional area of the inflow opening 13b may be smaller than that of the outflow opening 13c.

In the examples shown in FIG. 5(C) to FIG. 5(E), the penetrating part 13a has, in the circumferential direction (rotation direction of the rotor 8) of the stator 3, the penetrating part 3a includes the minimum cross-sectional part 13d having the width Sm narrower than the inflow opening 13b and the outflow opening 13c in the middle of the section from the inflow opening 13b to the outflow opening 13c. Specifically, in the penetrating part 13a, the width thereof in the circumferential direction of the stator 3 is gradually reduced from the inflow opening 13b toward the minimum cross-sectional part 13d. Also, in the penetrating part 13a, the width thereof in the circumferential direction of the stator 3 is gradually increased from the minimum cross-sectional part 13d toward the outflow opening 13c.

The penetrating part 13a may be the circular cross-section, namely a shape of hourglass, in the entire section from the inflow opening 13b to the outflow opening 3c, as described above (FIG. 5C), or the cross-section in the entire section may be rectangular (FIG. 5(D)).

When the cross-section in the entire section of the penetrating part 13a is made quadrangular, the ratio of the sides of the quadrangle may be changed vertically and horizontally (FIG. 5(E)). In the example shown in FIG. 5(E), the minimum cross-sectional part 13d forms the minimum cross-sectional section, but in the back-side end 13e of the penetrating part 13a, the section from the inflow opening 13b to the minimum cross-sectional part 13d and the minimum cross-sectional section formed by the minimum cross-sectional part 13d extend both in parallel to the center line without any steps; and the section from the minimum cross-sectional part 13d to the outflow opening 13c is inclined so as to gradually apart from the center line. On the other hand, in the example shown in FIG. 5(E), the section from the inflow opening 13b to the minimum cross-sectional part 13d is inclined so as to gradually approach to the center line, and the minimum cross-sectional section formed by the minimum cross-sectional part 13d and the section from the minimum cross-sectional part 13d to the outflow opening 13c extends both in parallel to the center line without any steps.

The penetrating part 13a shown in FIG. 5(E) may be a hole but slit is suitable for embodiment.

In the penetrating part 13a having the minimum cross-sectional part 13d, as far as the cross-sectional area thereof is gradually decreased from the inflow opening 13b to the minimum cross-sectional part 13d, and in the penetrating part 13a not having the minimum cross-sectional part 13d, as far as the cross-sectional area thereof is gradually decreased from the inflow opening 13b to the outflow opening 13c, in either case, the cross-section of the entire section of the penetrating part 13a a polygon more than triangle or pentagon, or may be a curved line shape other than a circle or a combination of a curved line and a straight line. Further, the entire section of the penetrating part 13a may have the section having the cross-sectional shape different from that of other section, and these various modifications are possible. The points where the various changes can be made are the same in the embodiment shown in FIG. 1(B) and FIG. 2.

CONCLUSION

According to the present invention, a novel stirrer in which generation of the cavitation is further suppressed could be provided. Moreover, Significant effects on the practical use can be achieved only by changing the shape of penetrating hole in the stator.

The conventional stirrer 100 shown in FIG. 1(A) attempts to improve the reduction of the cavitation from the side of the rotor, the effect of reducing the cavitation was observed, but not sufficient yet, therefore, the inventor of the present invention has attempted to improve it from the side of the stator; as a result, significant effect has been observed.

In the stator of the stirrer 100 shown in FIG. 2 to which the present invention is applied, a plurality of penetrating parts is arranged in a cylindrical stator having a cylindrical cross-sectional view, a fluid to be processed is discharged from the inside to the outside of the stator by rotation of a rotor; an opening in the inner wall surface thereof is served as an inflow opening, and an opening in an outer wall surface of the stator is served as an outflow opening; the opening area of the inflow opening is arranged so as to be larger than the opening area of the outflow opening.

In the penetrating part of the conventional stator, the area of the inflow opening was equal to the area of the outflow opening, or the area of the outflow opening was larger than that of the inflow opening. However, the discharge flow from the rotor was difficult to discharge due to the pressure loss, thus the generation of cavitation or the hollowing phenomenon was often seen.

Further, the discharge flow from the rotor is bent to a right angle in the inflow opening part of the stator. According to simulation, when the flow bent to a right angle, an almost infinite vacuum degree is generated.

By making the area of the inflow opening larger than the area of the outflow opening, the pressure loss is significantly reduced; thus, the fluid to be processed is smoothly introduced into the penetrating part of the stator 3 and is discharged from the outflow opening at a higher speed.

In addition, the problem of the discharge flow that bends at the right angle can be avoided, as a result, the problem of cavitation is significantly reduced.

As a result, the effect of the shear force is significantly improved, the fluid to be processed is efficiently processed, and the machine can be operated stably.

The invention claimed is:

1. A stirrer comprising a stator and a rotor capable of rotating to the stator,
   the rotor being provided with a main shaft as a center of the rotation and a plurality of blades,
   the stator being provided with one or a plurality of stator part,
   the stator part surrounding the plurality of blades with the main shaft of the rotor as the center thereof, and
   a rotational direction of the rotor being in a circumferential direction,
   the stator part comprising a plurality of penetrating parts in the circumferential direction thereof and a stator main part located at least between the penetrating parts adjacent to each other, and
   when discharging a fluid from inside to outside of the stator part through the penetrating part by rotating at least the rotor out of the rotor and the stator, at least any one of refinement, homogenization, emulsification, and dispersion being performed to the fluid; wherein
   a side of the stator part facing to the blades is served as an inner wall surface of the stator part, and a side of the stator part facing to a side opposite side to the blades is served as an outer wall surface of the stator part, and
   an opening of each of a plurality of the penetrating parts provided on the inner wall surface of the stator part is served as an inflow opening, an opening of each of a plurality of the penetrating parts provided on the outer wall surface of the stator part is served as an outflow opening, wherein
   an opening area of the inflow opening is arranged so as to be larger than an opening area of the outflow opening.

2. A stirrer comprising a stator and a rotor capable of rotating to the stator,
   the rotor being provided with a main shaft as a center of the rotation and a plurality of blades,
   the stator being provided with one or a plurality of stator part,
   the stator part surrounding the plurality of blades with the main shaft of the rotor as the center thereof, and
   a rotational direction of the rotor being in a circumferential direction,
   the stator part comprising a plurality of penetrating parts in the circumferential direction thereof and a stator main part located between the penetrating parts adjacent to each other, and
   a fluid being discharged from inside to outside of the stator part through the penetrating part by rotating at least the rotor out of the rotor and the stator; wherein
   a side of the stator part facing to the blades is served as an inner wall surface of the stator part, and a side of the stator part facing to a side opposite side to the blades is served as an outer wall surface of the stator part, and
   an opening of each of a plurality of the penetrating parts provided on the inner wall surface of the stator part is served as an inflow opening, an opening of each of a plurality of the penetrating parts provided on the outer wall surface of the stator part is served as an outflow opening, a space between the inflow opening and the outflow opening is served as an inner space of the penetrating part, and the inner space of the penetrating part includes a minimum cross-sectional part whose cross-sectional area is smaller than any other part of the inner space in the middle way from the inflow opening to the outflow opening, wherein
   an opening area of the outflow opening and an opening area of the inflow opening are provided so as to be larger than the cross-sectional area of the minimum sectional-area part of the inner space of the penetrating part.

3. The stirrer according to claim 1, wherein
   the penetrating part is at least any one of a slit and a penetrating hole, and
   the extending direction of the main shaft of the rotor is as an axial direction,
   in the slit, a width in the axial direction of the stator part is larger than a width of the slit in the circumferential direction of the stator part, the slit is at least any one of a long hole having both ends in the axial direction of the stator part and a cut-out part having one end thereof opened in the axial direction of the stator part;
   in the slit, a width (Si) of the inflow opening is provided so as to be larger than a width (So) of the circumferential direction of the outflow opening in the circumferential direction of the stator part; and
   in the penetrating hole, an area of the hole of the inflow opening is provided so as to be larger than an area of the hole of the outflow opening.

4. The stirrer according to claim 2, wherein
   the penetrating part is at least any one of a slit and a penetrating hole, and
   the extending direction of the main shaft of the rotor is as an axial direction,
   in the slit, a width in the axial direction of the stator part is larger than a width of the slit in the circumferential direction of the stator part, the slit is at least any one of a long hole having both ends in the axial direction of the stator part and a cut-out part having one end thereof opened in the axial direction of the stator part;
   in the slit, a width (So) of the outflow opening and a width (Si) of the inflow opening are provided so as to be larger than a width (Sm) of the minimum cross-sectional part in the inner space in the circumferential direction of the stator part; and
   in the penetrating hole, an area of the hole of the outflow opening and an area of the hole of the inflow opening are provided so as to be larger than an area of the hole of the minimum cross-sectional part in the inner space.

5. The stirrer according to claim 1, wherein a maximum length of an arc of the outflow opening that forms the arc along the circumferential direction of the stator part is 2 mm or more.

6. The stirrer according to claim 1, wherein
   the stator is provided with a plurality of the stator parts in a radial direction of the stator concentrically with the main shaft of the rotor.

7. The stirrer according to claim 2, wherein a maximum length of an arc of the outflow opening that forms the arc along the circumferential direction of the stator part is 0.2 mm or more.

8. The stirrer according to claim 3, wherein a maximum length of an arc of the outflow opening that forms the arc along the circumferential direction of the stator part is 0.2 mm or more.

9. The stirrer according to claim 4, wherein a maximum length of an arc of the outflow opening that forms the arc along the circumferential direction of the stator part is 0.2 mm or more.

10. The stirrer according to claim 2, wherein
the stator is provided with a plurality of the stator parts in a radial direction of the stator concentrically with the main shaft of the rotor.
11. The stirrer according to claim 3, wherein
the stator is provided with a plurality of the stator parts in a radial direction of the stator concentrically with the main shaft of the rotor.
12. The stirrer according to claim 4, wherein
the stator is provided with a plurality of the stator parts in a radial direction of the stator concentrically with the main shaft of the rotor.
13. The stirrer according to claim 5, wherein
the stator is provided with a plurality of the stator parts in a radial direction of the stator concentrically with the main shaft of the rotor.

* * * * *